Patented Feb. 21, 1939

2,147,995

UNITED STATES PATENT OFFICE 2,147,995

MOUNTING FOR BEARINGS FOR KNIFE EDGES

William Timson, Birmingham, England, assignor to W. & T. Avery Limited, Birmingham, England Application May 20, 1937, Serial No. 143,782
In Great Britain May 23, 1936

1 Claim. (Cl. 308—2)

This invention has reference to improvements in mounting for bearings for knife-edges and is concerned more particularly with mountings for the agate bearing commonly provided for the knife-edges of weighing apparatus.

The present invention has for its object the provision of an improved mounting for bearings of the said kind which permits of a degree of self-alignment of the bearings thereby facilitating assembly and which dispenses with cementing or similar means of holding the bearing in its mounting.

The invention consists of an improved mounting for the bearings of knife-edges which comprises a sheet metal member provided with means for securing it preferably adjustably to a support and a retaining section within which the bearing is disposed and which is adapted to fit within a housing provided therefor, the said retaining section having side flanges which when the retaining section is disposed within its housing bear on the sides of the bearing adjacent an end thereof and grip the bearing so as to permit of a degree of movement thereof which allows of a self-alignment of the bearing about a substantially vertical axis, said retaining section preferably being provided also with a raised transverse rib which provides for the self-alignment of the bearing about a horizontal axis.

The invention still further consists in the improved mounting for the bearings for knife-edges to be described hereinafter.

A convenient embodiment of the invention will now be described with particular reference to the accompanying sheet of drawings which illustrate the invention in its application to a mounting for agate bearings for the knife-edges of weighing apparatus.

In the drawing:—

Figure 1:
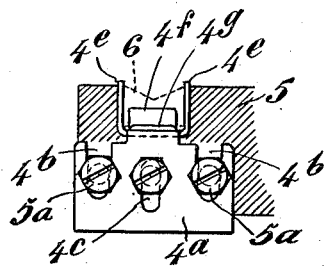
Figure 1 is a rear view of the improved mounting.

According to the embodiment of the invention illustrated in the drawing the improved mounting comprises a sheet metal member having a depending vertically disposed section $4^a$ provided with slots $4^b$ and a hole $4^c$ through which may be passed screws or bolts $5^a$ for adjustably securing the retaining member to a fixed part 5 of the weighing apparatus. Integral with the said depending section $4^a$ is a retaining section comprising a horizontally disposed base $4^d$, upstanding flanges $4^e$ at each side and a short upstanding flange $4^f$ at the outer end which serves as a limiting stop.

Figure 2:
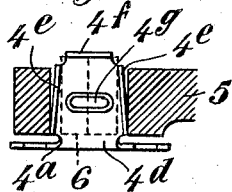
Figure 2 is a plan of Figure 1.
Figure 3:
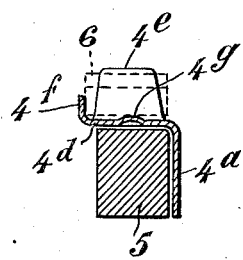
Figure 3 is a transverse section of Figure 1.
Figure 4:
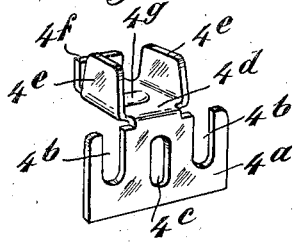
Figure 4 is a perspective view of the sheet metal member shown separately.

The base $4^d$ is formed with a transversely disposed upstanding rib $4^g$ of a substantially arcuate shape in cross section, see Figure 2.

The side flanges $4^e$ are not arranged parallel to one another but converge towards the outwardly disposed end of the retaining section, see Figure 2, and the width of the base $4^d$ is such that when the retaining section is pressed within a slot provided therefor in a fixed part 5 of the weighing apparatus the side flanges $4^e$ are pressed inwardly and caused to grip the bearing 6 adjacent to the outwardly presented end thereof. This gripping of the agate bearing 6 by an end section of the side flanges $4^e$ permits a slight self-aligning movement of the bearing 6 about a substantially vertical axis in addition to which movement is permitted about the transverse rib $4^g$ so that a self-alignment of the bearing 6 can take place about a horizontal axis.

A mounting constructed as hereinbefore described is readily adapted to existing forms of weighing apparatus and dispenses entirely with any cementing of the agate bearing in a cup and, furthermore, provides for a degree of self-alignment which provides for accurate operation of the weighing apparatus.

What I claim as my invention and desire to secure by Letters Patent is:

A mounting for the bearings of knife-edges comprising a sheet metal member having a vertically disposed section provided with apertured means through which may be passed securing means for securing it to a relatively fixed part and a retaining section integral with said vertically disposed section and which incorporates a horizontally disposed base, side flanges which converge towards the outer end of the said retaining section, a limiting stop at the outer end of the base and a transverse rib on the upper surface of the said base the pressure exerted on the side flanges when the retaining section is located within a slot provided therefor in a fixed part of the weighing apparatus causing the side flanges to grip a bearing disposed within the retaining section adjacent to the outwardly presented end thereof whereby the bearing is permitted a degree of self-alignment about a substantially vertical axis, movement about the transverse rib providing a degree of self-alignment of the bearing about a horizontal axis.

WILLIAM TIMSON.